United States Patent [19]

Chandioux

[11] 4,421,197

[45] Dec. 20, 1983

[54] DEVICE FOR SUPPORTING A STEERING AND DRIVING WHEEL OF AN AUTOMOBILE VEHICLE

[75] Inventor: Andre Chandioux, Paris, France

[73] Assignees: S.A. Automobiles Citroen; Automobiles Peugeot, both of Paris, France

[21] Appl. No.: 323,083

[22] Filed: Nov. 19, 1981

[51] Int. Cl.³ .................................. B60K 17/30
[52] U.S. Cl. ...................... 180/258; 188/206 R; 277/DIG. 4
[58] Field of Search ............... 180/259, 258, 254, 253, 180/252; 188/18 A, 206 R; 301/6E; 308/186, 191; 277/DIG. 4

[56] References Cited

U.S. PATENT DOCUMENTS 4,359,128 11/1982 Krude .................. 180/258

FOREIGN PATENT DOCUMENTS 1380561 12/1964 France .

Primary Examiner—John A. Pekar
Assistant Examiner—D. Lynn Fugate
Attorney, Agent, or Firm—Karl F. Ross; Herbert Dubno

[57] ABSTRACT

A device for supporting a steering and driving wheel of an automobile vehicle comprises a hollow hub constituting the outer element of a ball joint of which the inner element is fixed on a drive shaft, a seal element made of sheet metal being provided at the open end of the hub, opposite the joint. A brake disc having a central opening is fixed on the hub on the same side as the wheel. The seal element is in the form of a bowl whose closed end is fitted in the hollow hub and whose length is such that the other end, of outer diameter substantially equal to the diameter of the opening in the brake disc, opens outside the hollow hub and passes through the disc, centering same.

5 Claims, 1 Drawing Figure

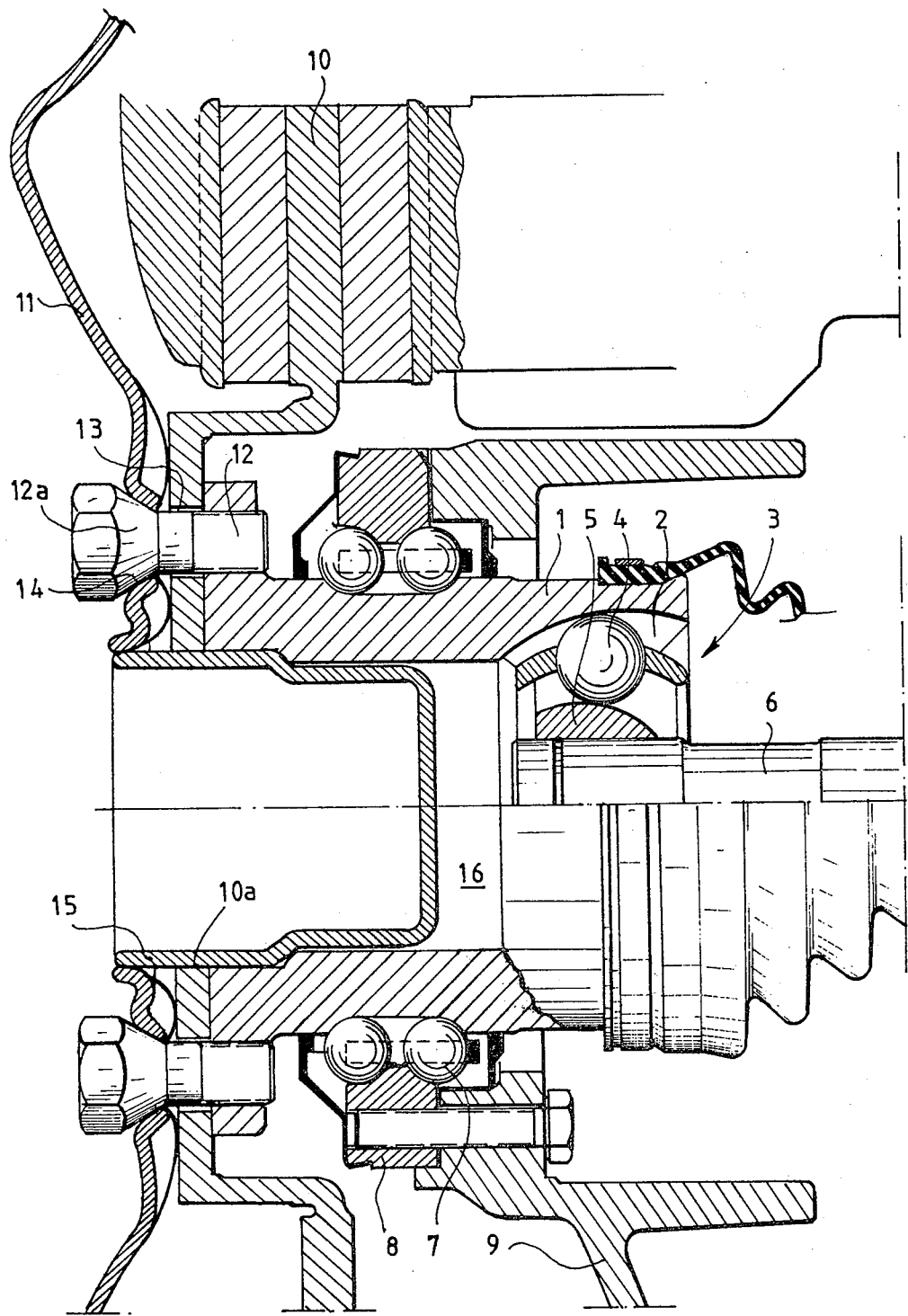

DEVICE FOR SUPPORTING A STEERING AND DRIVING WHEEL OF AN AUTOMOBILE VEHICLE

FIELD OF THE INVENTION

The present invention relates to an assembly for supporting a steering driving wheel of an automobile vehicle, comprising a hollow hub constituting the outer element of a ball-joint, for example of the RZEPPA type, of which the inner element is fixed on a drive shaft, a seal element made of sheet metal being provided at the open end of the hub, opposite the joint.

BACKGROUND OF THE INVENTION

A device of above mentioned type is described in French Pat. No. 1,380,561. In this device, the seal element is constituted by a simple sheet metal plate provided with a flange and fitted in the open end of the hub.

Furthermore, it is known to fix a brake disc on a drive plate of the wheel, on the same side as this wheel. In such devices, the brake disc may be centered and the wheel precentered by a cylindrical extension of the plate.

OBJECT OF THE INVENTION

An object of the present invention is the provision of a device or assembly for supporting a steering and driving wheel of an automobile vehicle, of the type mentioned hereinabove and in which the brake disc is centered in particularly simple and economical manner, allowing both a saving in material and a saving in weight, while avoiding a machining of the bearing surface of the brake disc.

SUMMARY OF THE INVENTION

The device according to the invention is characterised in that, in manner known per se, the brake disc is fixed on the hub on the same side as the wheel, and in that the seal element is in the form of a bowl whose closed end is fitted in the hollow hub and whose length is such that the other end, of outer diameter substantially equal to the inner diameter of the brake disc, opens outside the hollow hub and passes through the disc, centering same.

BRIEF DESCRIPTION OF THE DRAWINGS

The invention will be more readily understood on reading the following description with reference to the accompanying drawing, in which the single FIGURE shows a view in axial section through the support device according to the invention.

SPECIFIC DESCRIPTION

The support device according to the invention comprises a hollow and tubular wheel hub 1, on the inner surface of which are machined tracks 2 so as to constitute the outer element of a universal joint 3 with balls 4, for example of the RZEPPA type, of which the inner element 5 is fixed on a transmission shaft 6. The hub 1 is supported by means of a ball bearing 7 whose inner ring is constituted by the hub while its outer ring 8, is fixed on a support or frame element 9.

A brake disc 10 and a wheel 11 are fixed on the hub 1 by screws 12 with frustoconical heads 12a which pass through openings 13 in the brake disc and conical openings 14 in the wheel. A seal element 15 made of stamped sheet metal is provided at the open end of the hub opposite the joint.

The seal element 15 is in the form of a bowl whose closed end is fitted in the opening 16 of the hub 1. It has an outer diameter substantially equal to the diameter of the opening 10a in the brake disc 10 and a length such that, once fitted inside the hub 1, it projects by a distance at least equal to the thickness of the stack formed by the brake disc 10 and the web of the wheel 11.

During assembly, the brake disc 10 is fitted and centered on the seal element 15 on which the wheel 11 is then precentered. The assembly is then fixed on the outer face (directed to the left in the drawing) of the hub 1 by means of the fixing screws 12 screwed in the hub, the disc 10 being clamped between this hub and the wheel 11 of which the final centering is effected by means of the conical heads 12a of the screws 12 cooperating with the conical openings 14 in the wheel.

It is obvious that the present invention is not to be considered as being limited to the embodiment which has just been described and shown, but covers, on the contrary, all variants thereto.

What is claimed is:

1. A support assembly for a steering and driving wheel of an automotive vehicle, the support comprising:
    a tubular hub centered on an axis and having an axially outwardly directed face;
    a drive shaft at the axis;
    a ball-type universal joint having an inner part on the drive shaft and an outer part on the hub, whereby the joint rotationally couples the shaft to the hub;
    a brake disk secured to the outer face of the hub and having a hole centered on the axis, the hub having an inside diameter at the outer face equal substantially to the inside diameter of the hole of the brake disk, the wheel being secured with the brake disk to the outer face of the hub; and
    a bowl-shaped sheet-metal seal element fitted snugly into the tube and projecting outwardly therefrom through the hole, the outer diameter of the seal element at the outer face being substantially equal to the inside diameter of the hole and tube, whereby the seal element centers the disk and hub relative to each other.

2. The support assembly defined in claim 1 wherein the wheel is formed with a central hole of substantially the same inside diameter as the hole of the disk, the seal element passing through and fitting snugly in both of the holes.

3. The support assembly defined in claim 1 wherein the disk lies between the wheel and the outer face, the assembly further comprising:
    screws engaged through the wheel and disk and threaded into the hub for securing the disk, wheel, and hub together.

4. The support assembly defined in claim 1, further comprising:
    a stationary frame element; and
    a bearing supporting the hub on the frame element for rotation about the axis.

5. The support assembly defined in claim 1 wherein the disk, hub, and seal element are substantially symmetrical about the axis.

* * * * *

UNITED STATES PATENT AND TRADEMARK OFFICE
CERTIFICATE OF CORRECTION

PATENT NO. : 4,421,197
DATED : 20 December 1983
INVENTOR(S) : Andre CHANDIOUX

It is certified that error appears in the above-identified patent and that said Letters Patent is hereby corrected as shown below:

In the heading, left-hand column, please insert item [30] as follows:

-- Foreign Application Priority Data:

December 5, 1980 [FR] France..........80 26147 --.

Signed and Sealed this

Fifteenth Day of May 1984

[SEAL]

Attest:

GERALD J. MOSSINGHOFF

Attesting Officer     Commissioner of Patents and Trademarks